(12) United States Patent
Jung

(10) Patent No.: US 9,489,205 B1
(45) Date of Patent: Nov. 8, 2016

(54) COMPILER-ASSISTED LOOK-AHEAD INSTRUCTION-FETCH AND BRANCH-PREDICTION SYSTEM APPARATUS AND METHOD FOR MICROPROCESSORS

(71) Applicant: Yong-Kyu Jung, Erie, PA (US)

(72) Inventor: Yong-Kyu Jung, Erie, PA (US)

( * ) Notice: Subject to any disclaimer, the term of this patent is extended or adjusted under 35 U.S.C. 154(b) by 11 days.

(21) Appl. No.: 14/791,266

(22) Filed: Jul. 3, 2015

(51) Int. Cl.
*G06F 9/45* (2006.01)
*G06F 9/38* (2006.01)
*G06F 9/30* (2006.01)

(52) U.S. Cl.
CPC ............ *G06F 9/3804* (2013.01); *G06F 8/41* (2013.01); *G06F 9/3016* (2013.01)

(58) Field of Classification Search
CPC ............................ G06F 9/3804; G06F 8/41
USPC .................................................. 717/140–153
See application file for complete search history.

(56) References Cited

U.S. PATENT DOCUMENTS

| | | | | |
|---|---|---|---|---|
| 5,790,824 | A * | 8/1998 | Asghar ................. | G06F 9/3017 712/209 |
| 6,112,019 | A * | 8/2000 | Chamdani ............. | G06F 9/3836 712/214 |
| 6,397,379 | B1 * | 5/2002 | Yates, Jr. ............ | G06F 9/45554 717/140 |
| 6,546,550 | B1 * | 4/2003 | Ogata ................. | G06F 9/45504 712/233 |
| 6,662,354 | B1 * | 12/2003 | Krablin ................ | G06F 8/433 717/140 |
| 7,493,607 | B2 * | 2/2009 | Moritz ................. | G06F 8/4432 711/129 |
| 7,653,527 | B2 * | 1/2010 | Guenther ............. | G06F 9/45537 703/24 |
| 7,809,547 | B2 * | 10/2010 | Guenthner ............. | G06F 9/455 703/26 |
| 7,954,094 | B2 * | 5/2011 | Cascaval ............. | G06F 9/45516 717/140 |
| 8,452,946 | B2 * | 5/2013 | Liu ....................... | G06F 8/4442 712/216 |
| 8,473,565 | B2 * | 6/2013 | Browning ............... | G06F 13/38 709/202 |
| 8,924,975 | B2 * | 12/2014 | Memik ................. | G06F 9/4843 702/186 |
| 8,966,457 | B2 * | 2/2015 | Ebcioglu ............ | G06F 17/5045 716/105 |

OTHER PUBLICATIONS

Li et al, "Compiler-assisted Data Distribution for Chip Multiprocessors", ACM, pp. 501-512, 2010.*
Zhang et al, "Demo: Runtime MAC Reconfiguration Using a Meta-compiler Assisted Toolchain", ACM, pp. 277-278, 2012.*
Xiang et al, "Compiler Aided Manual Speculation for High Performance Concurrent Data Structures ", ACM, pp. 47-56, 2013.*
Cytron et al, "A Compiler-Assisted Approach to SPMD Execution", IEEE, pp. 398-406, 1990.*

(Continued)

*Primary Examiner* — Anil Khatri

(57) ABSTRACT

A method and system of the compiler-assisted look-ahead instruction-fetch branch-prediction (CLIB) comprising simple, small, and twice as fast instruction caches are designed for improving both speed and accuracy of instruction fetch and branch prediction by prefetching and fetching a type of instructions for accurate, look-ahead instruction prefetching, fetching and branch prediction and another type of instructions for compatible instruction prefetch and fetch. The invention is also designed for converting each basic block found in the program compiled by compilers in prior arts to a look-ahead instruction and a single or plurality of compatible instructions. The invention is also designed for delivering the look-ahead instructions to branch predictors before fetching the compatible instructions of the look-ahead instructions. In particular, both of the different types of the instructions are concurrently fetched to a single or plurality of microprocessors in an accurate and timely manner while achieving compatibility of the original program.

17 Claims, 3 Drawing Sheets

(56) References Cited

OTHER PUBLICATIONS

Fu et al, "Accelerating Distributed Discrete Event Simulation through Exchange of Conditional", IEEE, pp. 183-189, 2014.*

Shevgoor et al, "Efficiently Prefetching Complex Address Patterns", ACM, pp. 141-152, 2015.*

Kadjo et al, "B-Fetch: Branch Prediction Directed Prefetching for Chip-Multiprocessors", IEEE, pp. 623-634, 2014.*

\* cited by examiner

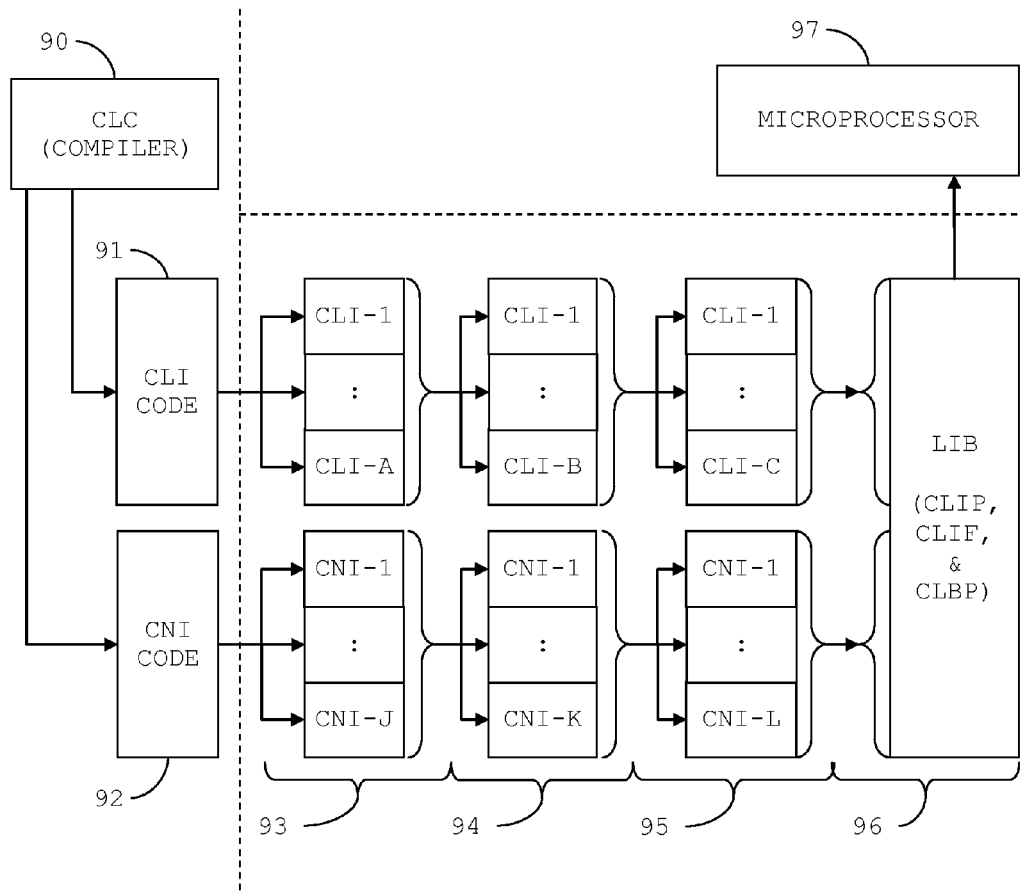

93: MAIL MEMORY (CLIM AND CNIM)
94: L2 CACHE (L2 CLIC AND CNIC)
95: L1 CACHE (L1 CLIC AND CNIC)
SIZE OF CLIC: A >= B >= C
SIZE OF CNIC: J >= K >= L
IN GENERAL CNIM >= CLIM AND CNIC >= CLIC
96: LIB: LOOK-AHEAD INSTRUCTION PREFETCH/FETCH/BRANCH
PREDICTION SYSTEM
CLC: COMPILER-ASSISTED LOOK-AHEAD COMPILATION
CLI: COMPILER-ASSISTED LOOK-AHEAD INSTRUCTION
CNI: COMPATIBLE NATIVE INSTRUCTION
CLIP: COMPILER-ASSISTED LOOK-AHEAD INSTRUCTION PREFETCH SYSTEM
CLIF: COMPILER-ASSISTED LOOK-AHEAD INSTRUCTION FETCH SYSTEM
CLBP: COMPILER-ASSISTED LOOK-AHEAD BRANCH PREDICTION SYSTEM

FIG. 3

COMPILER-ASSISTED LOOK-AHEAD INSTRUCTION-FETCH AND BRANCH-PREDICTION SYSTEM APPARATUS AND METHOD FOR MICROPROCESSORS

TECHNICAL FILED OF THE DISCLOSURE

The invention relates to creating a pair of instructions comprising a compiler-assisted look-ahead instruction (CLI) and a single or plurality of compatible native instructions (CNIs) from a basic block of program compiled in prior arts, where the basic block is a portion of the compiled program with only one entry point and only one exit point and the native instructions are the instructions discovered from the program compiled by the conventional compilers in prior arts. The CLI is for fetching and branch prediction quickly by accurately while the CNIs are for delivering the single or polarity of the native instructions of the CLI in compatible order.

The invention relates to the decomposition of the program in prior arts to the instruction fetch and branch prediction friendly instructions as CLIs and compatible form of native instructions, as CNIs. In particular, the CLI contains initial access information of the native instructions of the CNI to allocate the CLI and the CNI to different locations in memory and caches in parallel. Furthermore, the CLI also contains an address of next CLI if necessary.

The invention relates to prefetching and fetching a single or plurality of CLIs and CNIs in sequential or parallel from a single or plurality of main CLI and CNI memories via a single or plurality of levels of CLI and CNI caches to the single or plurality of microprocessors in an accurate and timely manner.

The invention relates to prefetch CLIs from both of taken-branch path and fall-though path and continue to prefetch a single or plurality of times more, where the taken-branch path is a location of next CLI if current CLI takes a branch and the fall-through path is a location of next CLI if the current CLI does not take a branch.

The invention relates to the software security used for preventing malicious and illegal copying of software programs.

BACKGROUND OF THE DISCOLOSURE

The present invention relates generally to decompose CLI and CNI from a basic block in the compiled program before look-ahead prefetching, fetching, and branch predicting of the CLIs and CNIs in a sequential and/or parallel manner via a single or plurality of twice fast caches as the microprocessor clock cycle. More specifically, it relates to a compiler-assisted look-ahead instruction-fetch and branch-prediction (CLIB) system apparatus and method to reduce latency of branch prediction, to increase instruction fetch bandwidth, which is a number of instructions fetches per the microprocessor clock cycle. The invention also relates to identify the CLI and CNIs. More specifically, a CLI represents a single or plurality of basic blocks and/or other CLIs and contains information to predicting branch operation, obtaining branch target location of the CLI, and accessing location of the associated CNI.

The CLIB system apparatus and method is designed for enhancing bandwidth of fetching both of the CLIs and CNIs, reducing latencies of instruction cache access, and improving the overall performance of the microprocessors. The invented CLIB system uses a compiler-assisted look-ahead instruction prefetching (CLIP) system and fetching (CLIF) system integrated to a single or plurality of concurrently accessible hierarchical CLIM systems.

The invented CLIP/CLIF system prefetches and/or fetches a single or plurality of CLIs concurrently for branch prediction and/or instruction decode to the microprocessors while delivering a single or plurality of CNIs in their compatible fetching order for instruction decode to the microprocessors. The CLIP/CLIF system prefetches and fetches CLIs and the associated CNIs from the single or plurality of concurrently accessible main CLI and CNI memories via a single or plurality of levels of concurrently accessible CLI and CNI caches and delivering the CLI and CNIs to the microprocessors.

The invented CLIP/CLIF system is capable of look-ahead prefetching the single or plurality of CNIs from the locations of the main CNI memories via the single or plurality of levels of CNI caches by obtaining a single or plurality of addresses from the CLIs to a single or plurality of locations in the main CLI memories and/or CLI caches. The CLIP/CLIF system prefetches the next prospective CLIs and CNIs from both of taken- and not-taken branch paths and continuously prefetch CLIs/CNIs from a single or plurality of next paths while fetching both of the CLIs and CNIs to the microprocessors.

The invented CLIB system includes a compiler-assisted look-ahead compiler (CLC) to decompose basic blocks, which generally contain pairs of branches and a branch target instructions and vice versa. In addition, the CLC creates a CLI to represent a basic block as a single instruction if necessary. In particular, the CLI contains a single or plurality of branch instructions and/or other CLIs. The CLI comprises the branch instructions with non-branch instructions in a loop or a subroutine, or all of the non-branch or branch target instructions. A CLI also comprises of a single or plurality of CNIs and/or other CLIs.

The invented CLC generates CLIs and associated CNIs from the compiled program, such as the assembly program. The CLIs and CNIs are sequentially and/or concurrently prefetched and/or fetched through separate paths of the CLIM systems if necessary. A CLI accesses a single or plurality of CNIs if the CNIs are bodies of the basic blocks in general. Thus, the CNIs are only fetched after prefetching both the CLIs as the basic block callers and the CNI and/or other CLIs as bodies of the basic blocks. This results in the look-ahead CLI prefetching and fetching for look-ahead branch prediction and the sequential and/or concurrent CNI prefetching and fetching.

The CLC composes a CLI comprising an associated opcode to identify it as a branch and/or a type of branch, such as conditional or unconditional branch, and other information including the first and/or the last associated CNIs, a number of native instructions included in the CLI, the information of the branch target location, and so on, for prefetching and fetching the next CLIs after decoding the CLI.

The CLIB system apparatus and method for microprocessors permits reducing a number of branch instructions while providing the compatible native instruction prefetching and fetching. In addition, the CLIB system apparatus and method for microprocessors allows scaling a basic block to a single or plurality of CLIs to prefetch and fetch native instructions in the same basic block in parallel and quickly while continuously providing the code compatibility. Alternatively, the CLC directly produces the CLIs and CNIs from high-level language programming.

The CLIB system apparatus and method for microprocessors effectively utilizes available instruction caches in terms of the cache size, power consumption, and operational speed by employing a simple, small, and twice fast access speed of the microprocessors' clock speed. The invention also prefetches in a look-ahead manner the CLIs and CNIs on both of the prospective paths in the program flow concurrently or sequentially before fetching and predicting branch in a look-ahead manner the CLIs and fetching CNIs concurrently or sequentially. Furthermore, the invention fetches CLIs and CNIs in an accurate manner by only fetching CLIs and/or CNIs from the CLI and/or CNI caches. More specifically, a number of native instructions encapsulated in CNIs are reduced by decomposing any flow control native instructions, including conditional and unconditional branches, subroutine callers, and subroutine returners, as CLIs and the other native instructions as CNIs. Since the flow control instructions do not change any operation results, CNIs provide compatibility if the CNIs are fetched and executed in right order. Therefore, CLIs contain important information regarding the order of the CNIs and are fetched to a branch predictor for predicting to fetch next CLI.

Through this invention, one can decompose their own compatible and ciphered instructions as CLIs and CNIs and prefetch and fetch CLIs/CNIs sequentially and/or concurrently from the main CLI/CNI memories via the levels of the CLI/CNI caches. More specifically, a single or plurality of branch prediction results is obtained by look-ahead prefetching and/or fetching of next CLIs and the associated CNIs to the microprocessors.

PROBLEMS OF THE ART

Demands for high-performance and energy-efficient mobile processors continue to grow over those for mobile smart-connected devices that place more weight on energy efficiency. In particular, smartphones are necessary to handle two different characteristics of applications: consistent low-power operations of mobile OS and related applications, and bursting high-performance applications, including gaming and video related applications. However, current microprocessors permit a trade-off between having energy efficiency and high-performance or a balanced performance and energy-consumption in mobile system-on-a-chip (SoC) processors. Therefore, the majority of mobile SoC processors have been built as heterogeneous SoC processors.

Since the performance and energy-efficiency of each microprocessor directly affect those of the mobile SoC processors, traditional approaches, including deeper pipeline, out-of-order and speculative execution, and sophisticated branch prediction, have been continuously employed by mobile processors. In particular, faster, larger, and special caches/memories and/or hardware or software prefetch/fetch mechanisms have constantly been applied to high-performance microprocessors in attempts to overcome such limitations and inefficiencies between microprocessors and memory systems. The compilers (i.e., gcc/icc/armcc) also had simple/advanced software prefetching/fetching algorithms to assist the microprocessors.

U.S. Pat. No. 7,181,597 [1] provides enhanced performance by employing a trace cache. In particular, this approach decodes the first instruction into a single or plurality of operations with a decoder. The decoder passes the first copy of the operations to a build engine associated with a trace cache. In addition, the decoder directly passes the second copy of the operation to a back end allocation module in a decoder. This approach enhances performance by selectively bypassing a trace cache build engine.

A trace cache [2] is presented that contains decoding information of the instructions consecutively executed before. To achieve higher throughput from superscalar processors, fetching multiple basic blocks per cycle becomes necessary. The trace cache supplements instruction cache by dynamically tracing the instruction stream and contiguously locating the instructions. The trace cache directly passes the decoding information when the same instruction stream is decoded. Consequently, performance enhancement and high bandwidth instruction fetching can be achieved with the trace cache. However, this approach heavily relies on the capability of employing branch prediction hardware for performance improvement. The trace cache approach must obtain decoding results after dynamically decoding the same instructions. The trace cache approach cannot hold all of the traces of the multiple blocks without increasing the trace cache size. Furthermore, this approach must decode again and keep the trace of the decoded results of the instruction block if the trace of the same block is changed.

U.S. Pat. No. 6,167,536 [3] presents an on-chip instruction trace cache capable of providing information for reconstructing instruction execution flow. In particular, U.S. Pat. No. 6,167,536 [3] presents the instructions that disrupt the instruction flow by branches, subroutines, and data dependencies. Therefore, this approach allows less expensive external capture hardware to be utilized and also alleviates various bandwidth and clock synchronization issues confronting many existing solutions.

U.S. Pat. No. 6,047,368 [4] claims that an instruction packing apparatus employs a compatibility circuit including translation and grouper circuits where the translation and grouper circuits, respectively, transform old instructions to new instructions as simpler forms and group instructions based on instruction type by hardware when transferring a cache line from the memory to cache. Although the dynamical packing and identifying of assigned functionalities of the assembled instructions issue and execute concurrently, this approach focuses only on increasing instruction level parallelism while paying additional hardware cost. U.S. Pat. No. 6,047,368 [4] still requires at least the same or more instruction cache.

U.S. Pat. No. 5,509,130 [5] describes packing and issuing instructions simultaneously per clock cycle for execution. An instruction queue stores sequential instructions of a program and branch target instruction(s) of the program, both of which are fetched from the instruction cache. The instruction control unit decodes the sequential instructions, detects operands cascading from instruction to instruction, and groups instructions according to a number of exclusion rules which reflect the resource characteristics and the processor structure. This approach, however, groups instructions after fetching sequential instructions from the instruction cache. Therefore, it still requires involving branch prediction and resolution units for branch instructions because of packing at runtime.

U.S. Pat. No. 7,269,715 [6] presents an improved method and apparatus for packing instructions processed in the same sized instruction sets. This approach distinguishes a current set of instructions received as part of a group including a prior set of instructions using a history data structure. The assembled or reformatted nonnative instructions with a packing indication are issued to the execution units. This approach requires additional hardware, such as grouper circuit and translation circuit.

U.S. Pat. No. 8,527,969 [7] presents systems and methods for dynamic binary translation in an interpreter. U.S. Pat. No. 8,245,208 [8] presents to generate loop code to execute on single-instruction multiple-datapath architecture. U.S. Pat. No. 5,999,739 [9] presents a procedure to eliminate redundant conditional branch statements from a program. These approaches do not generate two different types of code to deliver compatible instructions, such as CNIs, in a type of code guided by other instructions, such as CLIs, in another type of code. Therefore, the CLIB system apparatus and method for microprocessors is different from the approaches in prior arts.

The invention deals with both scaled and non-scaled CLIs that include loops and/or subroutines with branch instructions and decomposes them to a single CLI and the associated CNIs. Branch prediction, therefore, is not necessary for those branch instructions already decomposed to a CLI, but executes compatible branch operations of the entire loop/subroutine decomposed.

Since a CLI dynamically access to identical or shortened basic block or the number of consecutive non-branch instructions as CNIs during the instruction prefetch/fetch operations, the microprocessor continues to execute the compatible instructions as CNIs while a fetched CLI is used for predicting branch and forwarding a branch target address for prefetching/fetching the next CLI by updating the associated CLI program counter installed in the CLI prefetching/fetching system.

The invention also prefetcher and/or fetches CLIs within fewer cycles than the microprocessors in prior arts do. It is true that an amount of basic blocks are less than equal to an amount of native instructions in the basic blocks. A microprocessor along with the CLIB system fetches a fewer number of CLIs than the same microprocessor without employing the CLIB system fetches more number of instructions. Thus, the invention permits that instruction fetches and branch predictions can be started a plurality of times earlier than the same fetch and branch prediction operations executed by the microprocessor without employing the CLIB system.

Unlike data prefetching, instruction prefetching is complicated and implemented as hardware [10, 11]. Since instruction prefetching accuracy is an important factor to mitigate i-cache pollution, often instruction prefetchers employ branch predictors to achieve further alleviation of instruction fetch bandwidth [12, 13]. Existing look-ahead prefetching, however, is still limited by branch prediction bandwidth [14]. Therefore, the invented CLIB system does not include any branch predictors for prefetching. Instead, the prefetcher in the CLIB system is built as a modified two-consecutive wrong path prefetcher with simple decoder. In order to provide a look-ahead prefetching capability, the branch targets are obtained by decoding CLIs. In order to mitigate known disadvantages of the wrong path approach [15], such as increasing memory/cache traffic and pollution, a fewer number of CLIs are prefetched first and then the associated native instructions of the CLIs are prefetched in parallel from the concurrently accessible memory and caches. In particular, the caches holding CLIs and the associated native instructions of the CLIs have two times faster access time than the caches used in prior arts.

In addition, the invention allows all CNIs of the associated CLIs to concurrently fetch if necessary. The invention temporarily holds its next fetch operation until the CLI representing a conditional branch instruction is predicted. This prevents unwanted native instructions from being fetched to the microprocessor. Alternatively, a branch predictor shared with a microprocessor and the invented system permits to predict the branch independently so that the invention can execute the next fetch operation without waiting for the branch prediction result from the microprocessor.

Furthermore, the invention removes the CLIs representing subroutine callers/returns and unconditional jumps while fetches only compatible native instructions in bodies of the subroutines if necessary.

Since each CLI representing a loop or a subroutine comprises one or more than one native instruction, the single or plurality of CNIs is prefetched in a sequential or concurrent manner. Therefore, prefetching early an ample number of native instructions as a single CLI concurrently and fetching the prefetched instructions in the compatible program order can compensate multi-cycle instruction cache or even longer main memory access time.

In addition, the number of instructions decomposed into each CLI is scaled in order to balance the instruction cache usage by allocating the CNIs of the consecutively located CLIs to the dedicated, separate regions in instruction caches and/or main memories, such as cache/memory banks, dual or multiple ports memories, and so forth. Consequently, the instruction cache usage in the invention reduces unused or frequently replaced cache lines according to the associated cache replacement policy. The invention is useful for parallel instruction prefetch from the main memory to the upper-level cache (i.e., L2 cache) and pipelined parallel instruction prefetch from the upper-level cache to the lower-level cache (i.e., L1 cache) according to the tradeoff between access per power consumption and the number of concurrently fetched and/or prefetched instructions for microprocessor performance, where the pipelined parallel instruction prefetch is to prefetch a CLI first before prefetching the associated single or plurality of CNIs in a parallel manner.

SUMMARY OF THE DISCLOSURE

The invention generally relates to a microprocessor system consisting of a software compiler as a compiler-assisted look-ahead compilation (CLC) system as a software component and a CLIB system consisting of a compiler-assisted look-ahead instruction memory (CLIM) system, a look-ahead instruction prefetch/fetch/branch prediction (LIB) system, and a microprocessor comprising an instruction fetch unit, a branch prediction unit, and other units typically found in prior arts.

The CLC generates a more microprocessor-friendly form of code from pre-compiled software code while maintaining code compatibility, because the microprocessor is inherently built for performing optimally with stream-lined code.

The CLC also generates two different codes for increasing the instruction fetch bandwidth and the ratio of the number of instructions fetched to those executed by the microprocessor via the CLIM system.

CLIs are representing basic blocks, including loops and branch instructions. A CNI contains a single or plurality of native instructions in each basic block represented by the associated CLI. The CLC generates segments of the instructions in the assembly code compiled by a software compiler in prior arts as CLIs. The CLC also generates the native instructions packed in a CLI comprising the native instruction segment in compatible order as a CNI. The CLIs provide a means to access the native instructions encapsulated and another CLI at the target of the taken-branch CLI.

A number of instructions in a packable instruction segment are scalable for fitting into the organizations of the single of plurality of CLIMs and CNIMs as main instruction memories, and the single of plurality of levels of CLICs and CNICs as instruction caches implemented in the CLIM system. The CLC generates a single loop CLI from a long loop by packing according to a loop scaling parameter and the instruction packing priority. The CLC generates the single loop CLI if the loop scaling parameter is greater than the number of instructions in the loop or the instruction packing priority is higher than the instruction scaling.

The invented CLIM system comprises a single or plurality of main instruction memories, such as main CLI memory (CLIM) and main CNI memory (CNIM), and a single or plurality of levels of instruction caches, such as L1 and/or L2 CLI caches (CLICs) and CNI caches (CNICs).

Unlike instruction memory systems in prior arts, the CLIM system must contain two different kinds of instructions, CLIs and the associated CNIs. Both CLIs and CNIs are prefetched and fetched to the microprocessor from the CLIM system via the LIB system. The CLIs and CNIs are stored in the separately accessible CLIMs and CNIMs and L1/L2 CLICs and CNICs. The CLICs and CNICs are designed for accessing a single or plurality of CLIs and CNIs from two times more quickly than conventional caches in prior arts can do. Thus, The CLICs and CNICs are capable of accessing the single of plurality of the CLIs and CNIs within a half cycle of the microprocessor's clock cycle. In order to achieve this requirement, the CLICs and CNICs are designed as small, simple caches, which also save dynamic/static operational energy consumption of the CLICs and CNICs.

The invented LIB system also comprises a single or plurality of compiler-assisted look-ahead instruction prefetch (CLIP) system, a single or plurality of compiler-assisted look-ahead instruction fetch (CLIF) system, and a single or plurality of compiler-assisted look-ahead branch prediction (CLBP) system.

The CLIP system does or does not include any branch predictors for prefetching. Instead, the CLIP system in the CLIB was built as a modified two-consecutive wrong path prefetcher with simple decoder in order to provide a look-ahead prefetching capability by decoding CLIs and obtaining the branch targets. The modified two-consecutive wrong path prefetcher with simple decoder prefetches CLIs from both of taken-branch path and fall-though path and continue to prefetch a single or plurality of times more, where the taken-branch path is a location of next CLI if current CLI takes a branch and the fall-through path is a location of next CLI if the current CLI does not take a branch.

The CLIP system also prefetches a fewer number of CLIs first and then the associated native instructions of the prefetched CLIs in parallel from the concurrently accessible CLIMs/CNIMs and/or L2 CNICs/CNICs to the concurrently accessible and two times faster access time of the L1 CNICs/CNICs than the caches used in prior arts.

In addition, multiple CNI streams can be prefetched by the CLIP system and/or fetched by the CLIF system in a pipelined parallel manner, while CLIs are prefetched by the CLIP system and/or fetched by the CLIF system sequentially. The two times fast CNICs and CNICs contribute to alleviate effects of cache traffic and pollution. Similar to fetching from each line of cache in prior arts, native instructions in a basic block are separately transformed to CLIs and CNIs by the same size of the cache line by the CLC.

The CLIF system is for delivering compatible order of the native instructions to the microprocessor in a timely and precise manner. The CLIF system fetches the CLIs and the CNI streams scaled via the two times fast CNICs and CNICs in the pipelined parallel manner. Therefore, the CLIF system delivers the CLIs to a branch predictor in the microprocessor in earlier cycles than instruction fetch mechanisms in prior arts can do.

The CLIF system provides accurate instruction fetching with the CLBP system, which allows the CLIF system to fetch only native instructions from the predicted or fall through paths and resumes next instruction fetching early.

The CLBP system can be implemented in the CLIB system if a microprocessor is preferable not to be modified. However, the CLBP system is removed from the CLIB system if the microprocessor can be changed. Furthermore, the modified microprocessor with the CLIB system can achieve additional performance gain and energy efficiency by (1) reducing the instruction fetch stages, (2) increasing instruction decoders, (3) increasing entries of instruction queue, (4) fetching both CLIs and CNIs to the microprocessor, and simplifying or removing other hardware components on the pipeline of the microprocessor if applicable.

There has thus been outlined, rather broadly, some of the features of the invention in order that the detailed description thereof may be better understood, and that the present contribution to the art may be better appreciated. Additional features of the invention will be described hereinafter.

In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

An object is to provide the CLIB apparatus and method that improves the energy efficiency and performance of the microprocessor system, including the achievement of accurate and/or look-ahead concurrent prefetching, fetching, and/or branch predicting of CLI and CNIs, for enhanced microprocessor throughput while maintaining compatibility of the software.

An object is to provide the CLC system that decomposes the native instructions in the software and/or assembly program into CLIs and CNIs. Alternatively, the CLIs and CNIs can also be generated by a single compilation that includes the same native instruction assembling capability as the invented system. The CLIs are composed by assigning different opcodes and other information to the CLIs if needed.

Another object is to provide the CLC system that eliminates and/or hides branch instruction(s) from the original program and composes compatible and customized forms of the CLIs for preventing malicious and illegal copying of various software programs while delivering compatible segments of the native instructions to the microprocessor.

An object is to provide the CLIB system that decodes the CLIs for concurrently prefetching and fetching the associated CNIs stored in dedicated, separate regions of distinct addresses in a single or plurality of the CNIMs and/or the CNICs.

Another object is to provide the CLIB system that obtains an access point of the associated CNIs from the CLIs and prefetches and/or fetches the associated CNIs during the CLI/CNI prefetching and/or fetching operations.

Another object is to provide the CLIB system that prefetches a single or plurality of CLIs from the next prospective locations, such as the next CLI at the branch target location and the next CLI at the fall-through path, whenever prefetching a CLI.

Another object is to provide the CLIB system apparatus and method that provides a way to satisfy the CLICs and CNICs usage and reducing branch prediction and cache access latencies through the invented accurate, look-ahead, pipelined, and parallel prefetching and fetching, unlike memory systems employed in microprocessors in prior arts.

Another object is to provide the CLIB system apparatus and method that provides a way to shorten branch prediction latency by delivering branch instructions to a branch predictor earlier than microprocessors in prior arts can do.

Another object is to provide the CLIB system apparatus and method that utilizes CLIs, which encapsulate only undisrupted native instruction segments, in the program to accurately prefetch the single or plurality of CNIs that will be prefetched, fetched and executed by the microprocessor, unlike prefetching and fetching a certain number of the native instructions that include many of the unused instructions for execution of the microprocessor in prior arts.

Other objects and advantages of the present invention will become obvious to the reader and it is intended that these objects and advantages are within the scope of the present invention. To the accomplishment of the above and related objects, this invention may be embodied in the form illustrated in the accompanying drawings, attention being called, however, to the fact that the drawings are illustrative only, and that changes may be made in the specific construction illustrated and described within the scope of this application.

BRIEF DESCRIPTION OF THE DRAWINGS

A more complete understanding of embodiments of the disclosure will be apparent from the detailed description taken in conjunction with the accompanying drawings in which:

FIG. 3 is a diagram showing one embodiment of organizations of a CLIB system comprising a single or plurality of CLIMs and CNIMs, a single or plurality of levels of CLICs and CNICs, and a LIB system comprising a CLIP system, a CLIF system, and CLBP system, for look-ahead sequential and/or parallel prefetching and fetching operations.

DETAILED DESCRIPTION OF EXAMPLE EMBODIMENTS

Figure 1:
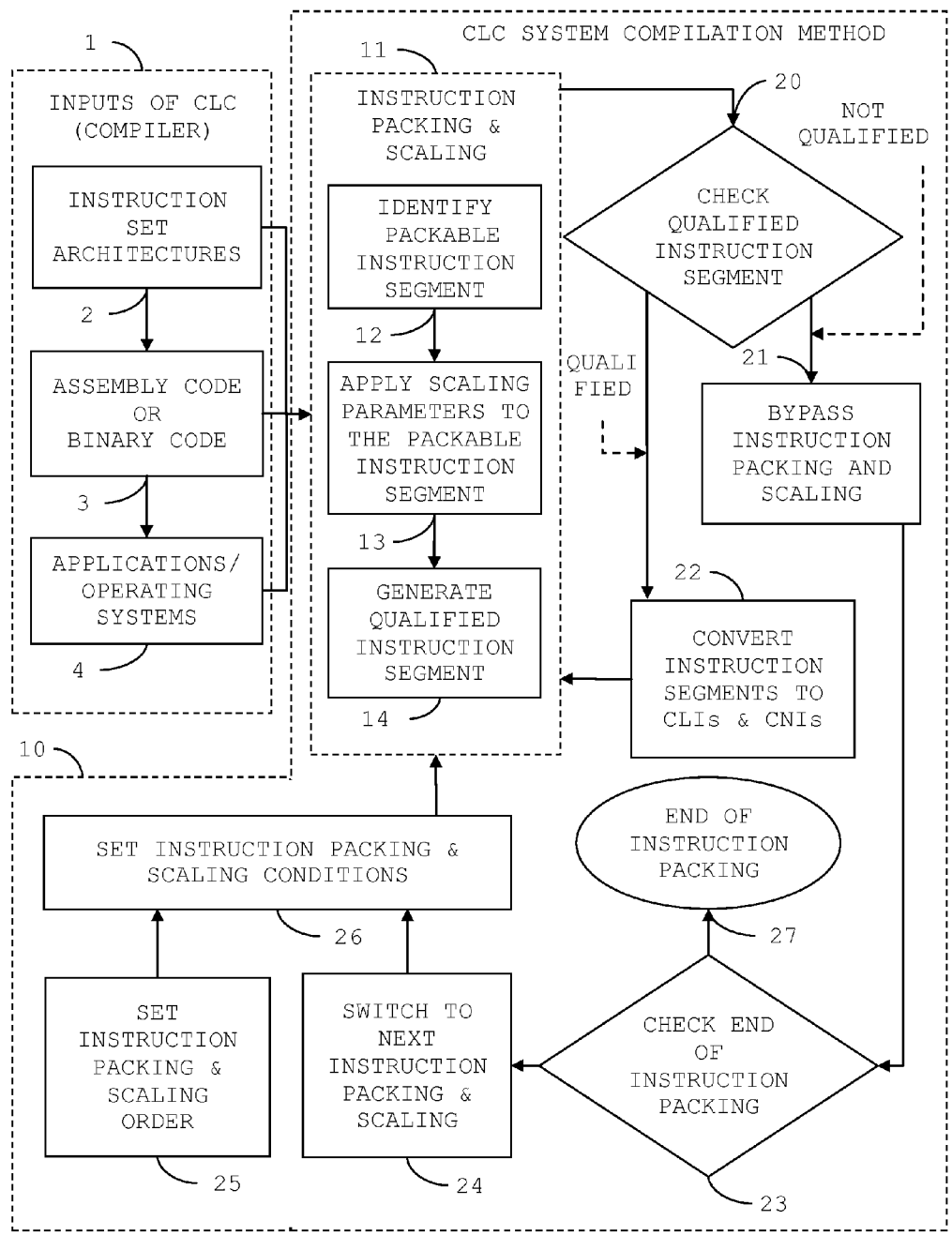
FIG. 1 is a diagram showing one embodiment of a CLC system for generating the CLIs and the associated CNIs from the instruction segments, including basic blocks, found in software and/or assembly program according to the instruction packing and scaling parameters.

FIG. 1 is a diagram showing one embodiment of a CLC system and compilation method 10, including CLIs and CNIs generation. The CLC system and compilation method 10 decomposes CLI 35 and CNI 36 from a basic block in the compiled program before look-ahead prefetching, fetching, and branch predicting of the CLIs 35 and CNIs 36 in a sequential and/or parallel manner via a single or plurality of twice fast CLICs 45, 46 and CNICs 42, 43 as the microprocessor clock cycle. More specifically, The CLC system and compilation method 10 reduces latency of branch prediction and increases instruction fetch bandwidth, which is a number of instructions fetched per the microprocessor clock cycle, with a CLIB system 70. The CLC system and compilation method 10 also identifies the CLIs 35 and the NIs of the CNIs 36. More specifically, a CLI 35 represents a single or plurality of basic blocks and/or other CLIs and contains information to predicting branch operation, obtains branch target location of the CLI 35, and accesses location of the associated CNI 36.

In one embodiment, the CLC system and compilation method 10 creates a pair of instructions comprising a CLI 35 and a single or plurality of CNIs 36 from a basic block of program compiled, where the basic block is a portion of the compiled program with only one entry point and only one exit point and the native instructions are the instructions discovered from the program compiled. The CLI 35 is for fetching and branch prediction quickly and accurately while the single or plurality of the NIs of the CNIs 36 are delivered in compatible order.

The CLC system and compilation method 10 decomposes the program to the instruction fetch and branch prediction friendly instructions as CLIs 35 and compatible form of native instructions, as CNIs 36. In particular, the CLIs 35 contain initial access information of the native instructions of the CNIs 36 in parallel to allocate the CLIs 35 and the CNIs 36 to different locations in a single or plurality of CLIMs 44 and CNIMs 41 and in a single or plurality of levels of CLICs 45, 46 and CNICs 42, 43. Furthermore, the CLI 35 also contains an address of next CLI 35 if necessary.

The CLC system and compilation method 10 performs instruction packing and scaling 11 with various CLC inputs 1 and predetermined instruction packing and scaling conditions 26. The various CLC inputs 1 includes target instruction set architectures 2, compiled assembly code or executable binary code 3, and/or high-level applications and operating system programs 4. The predetermined instruction packing and scaling conditions 26 require to set order of instruction packing and scaling 25 before the CLC compilation as well as to switch to next instruction packing and/or scaling operations 24. If a qualified instruction segment is generated, a single or plurality of CLIs 35 and CNIs 36 are generated 22. Otherwise, current CLC operation is terminated or is switched to the next instruction packing and/or scaling operations 24. The instruction packing and scaling 11 includes packable instruction segment identification 12, followed by applying optional scaling parameters to the packable instruction segment 13, and then qualified instruction segment generation 14 with the predetermined instruction packing and scaling conditions 26. If an instruction segment is successfully evaluated for packing by an instruction segment qualification 20, the qualified instruction segment is used for generating a single or plurality of CLIs and CNIs 22 and for continuing the instruction packing and scaling 11. Otherwise, termination of current instruction packing is evaluated 23. Entire instruction packing is terminated 27 if the current instruction segment is the last segment for packing. Otherwise, new instruction packing and scaling will be performed 24. In case of a plurality of instruction set architectures is employed for the instruction packing and scaling, new instruction packing and scaling conditions 26 are established with preferred instruction packing and scaling order 25.

Figure 2:
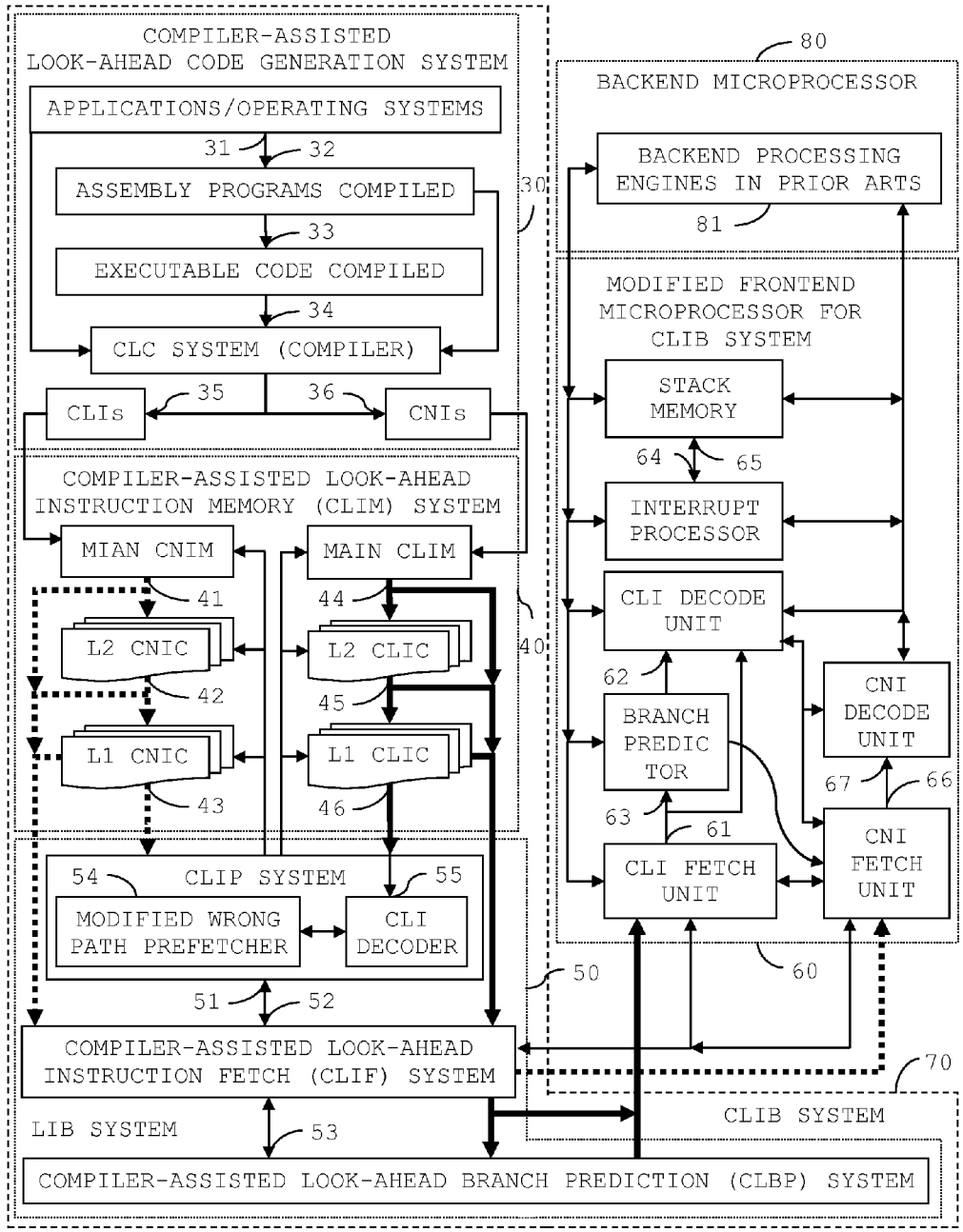
FIG. 2 is a diagram showing one embodiment of a CLIB system apparatus and method for microprocessors comprising a CLC system and a CLIM system, which comprises a single or plurality of CLIMs and CNIMs and a single or plurality of levels of CLICs and CNICs, a LIB system, which comprises a CLIP system, a CLIF system, and a CLBP system, and a microprocessor, which comprises a modified frontend of microprocessor for the CLIB system or a non-modified frontend of microprocessor and a backend of microprocessor.

FIG. 2 shows one embodiment of a CLIB system apparatus and method for a microprocessor comprising a backend microprocessor 80, a modified frontend microprocessor 60 for a CLIB system, and a CLIB system 70.

The microprocessor 60, 80 with the CLIB system 70 prefetches and fetches a single or plurality of CLIs 35 and CNIs 36 in sequential or parallel from a single or plurality of main CLIMs 44 and CNIMs 41 via a single or plurality of levels of CLICs 45, 46 and CNICs 42, 43 to a single or plurality of microprocessors 60, 80 with the CLIB systems 70 in an accurate and timely manner.

The microprocessor 60, 80 with the CLIB system 70 prefetches CLIs 35 from both of taken-branch path and fall-though path and continues to prefetch a single or plurality of times more via a CLIP system 51, where the taken-branch path is a location of next CLI 35 if current CLI 35 takes a branch and the fall-through path is a location of next CLI 35 if the current CLI 35 does not take a branch.

The microprocessor 60, 80 with the CLIB system 70 prevents malicious and illegal copying of software programs. The microprocessor 60, 80 with the CLIB system 70 creates compatible and ciphered instructions as CLIs 35 and CNIs 36 and to prefetch and fetch CLIs 35 and CNIs 36 sequentially and/or concurrently from the CLIMs 44 and the CNIMs 41 via the levels of the CLICs 45, 46 and the CNICs 42, 43. More specifically, the microprocessor 60, 80 with the CLIB system obtains a single or plurality of branch prediction results by look-ahead prefetching and/or fetching of next CLIs 35 and the associated CNIs 36 to the microprocessor 60, 80.

The microprocessor 60, 80 with the CLIB system 70 continuously executes the compatible instructions as CNIs 36 while a fetched CLI 35 is used for predicting branch and forwarding a branch target address for prefetching and fetching the next CLI 35 by updating the associated CLI program counter installed in the CLIP system 51 and the CLIF system 52. The microprocessor 60, 80 with the CLIB system 70 accesses CLIs 35 to prefetch and/or fetch identical or shortened basic blocks or the number of consecutive non-branch instructions as CNIs 36.

In one embodiment, the CLIB system 70 enhances bandwidth of fetching both of the CLIs 35 and CNIs 36 and reduces latencies of L2/L1 CLICs 45, 46 and CNICs 42, 43. The CLIB system 70 prefetches and/or fetches CLIs 35 within fewer cycles than the microprocessors in prior arts do by prefetching and/or fetching CLIs 35 initially and then prefetching and/or fetching CNIs 36 in a pipelined parallel manner via the twice as fast CLICs 45, 46 and the CNICs 42, as the microprocessor clock speed. The CLIB system 70 fetches a fewer number of CLIs than the same microprocessor without employing the CLIB system 70 fetches more number of instructions. The CLIB system 70 permits that instruction fetches and branch predictions can be started a plurality of times earlier than the same fetch and branch prediction operations executed by the microprocessor without employing the CLIB system 70.

The CLIB system 70 comprises a CLC generation 30, a CLIM system 40, and a LIB system 50. The CLIB system 70 achieves look-ahead prefetch, fetch, and branch prediction operations by generating CLIs 35 and compatible native instruction prefetch and fetch by to generating CNIs 36 via the CLC system 34. The CLIs and CNIs are stored to dedicated, separate regions in the CLIM system 40. The CLIs stored in a single or plurality of main CLIMs 44 are prefetched and fetched in a sequential and/or concurrent manner via a single or plurality of L2 CLICs 45 and L1 CLICs 46. The CNIs stored in a single or plurality of main CNIMs are prefetched and fetched in a sequential and/or concurrent manner via a single or plurality of L2 CNICs 42 and L1 CNICs 43. The LIB system 50 prefetches and fetches CLIs in a sequential and/or parallel manner via a CLIP system 51 and a CLIF system 52, respectively. In order to achieve look-ahead branch predictions, the CLBP system 53 fetches the CLIs representing branches that need to be predicted to the modified frontend microprocessor 60.

In one embodiment, the CLC generation system 30 comprises various inputs 31, 32, 33 of the CLC system 34. The various inputs include applications and/or operating systems programmed in high-level programming languages 31, conventional compilers in prior arts 32, and executable code in prior arts 33. The CLC system 34, as a compiler, generates CLIs 35 for performing look-ahead prefetching, fetching, and/or branch prediction and CNIs 36 for prefetching, fetching and executing compatible native instructions.

The CLC system 34 generates the CLIs 35 for guiding the CNIs 36 for delivering compatible instructions. The CLC system 34 decomposes basic blocks, which generally contain pairs of branches and branch target instructions and vice versa. In addition, the CLC system 34 creates a CLI 35 for representing a basic block as a single instruction if necessary. In particular, the CLI 35 contains a single or plurality of branch instructions and/or other CLIs 35. The CLI 35 comprises the branch instructions with non-branch instructions in a loop or a subroutine, or all of the non-branch or branch target instructions. The CLI 35 also comprises of a single or plurality of CNIs 36 and/or other CLIs 35.

More specifically, the CLC system 34 decomposes any flow control native instructions, including conditional and unconditional branches, subroutine callers, and subroutine returners, from a number of native instructions encapsulated in CNIs 36. The CLC system 34 composes CNIs 36 without the flow control instructions that do not change any operation results, but provides compatible fetching and executing orders of the CNIs 34 by adding important information regarding the prefetching, fetching, and branch predicting orders of the CNIs 36. The CLC system 34 also composes CNIs 36 with conditional branch native instructions, which must be delivered and executed in order to determine the associated CLI branch prediction results. In this case, the associated CLI fetched via the CLI fetch unit 61 does not need to be forwarded to the CNI fetch unit 66 or the CNI decode unit 67. If conditional branch native instructions are decomposed from the CNIs, the associated CLI containing the conditional branch native instructions are forwarded to the CNI fetch unit 66 or the CNI decode unit 67 for determining the branch results at the backend microprocessor 80. The CNI fetch unit 66 or the CNI decode unit 67 allocates the received CLI between the associated CNI and the next CNI in the CNI fetch order.

The CLC system 34 generates the CLIs 35 and the associated CNIs 36 from the compiled program 33, such as the assembly program. The CLIs 35 and CNIs 36 are sequentially and/or concurrently prefetched and/or fetched through separate paths of the CLIM system 40 if necessary. A CLI 35 accesses a single or plurality of CNIs 36 if the CNIs 36 are bodies of the basic blocks. The CNIs 36 are only fetched after prefetching both the CLIs 35 as the basic block callers and the CNIs 36 and/or other CLIs 35 as bodies of the basic blocks. The look-ahead CLI prefetching and fetching achieve look-ahead branch prediction and the sequential and/or concurrent CNI prefetching and fetching.

The CLC system 34 composes a CLI 35 comprising an associated opcode to identify the CLI itself as a branch and/or a type of branch, such as conditional or unconditional branch, and other information including the first and/or the last associated CNIs 36, a number of native instructions included in the CLI 35, the information of the branch target location, and so on, for prefetching and fetching the next CLIs 35 after decoding the CLI 35.

The CLC system 34 reduces a number of branch instructions while providing the compatible native instruction prefetching and fetching via the LIB system 50. In addition, the CLC system 34 scales a basic block to a single or plurality of CLIs 35 to prefetch and fetch native instructions in the same basic block in parallel and quickly via the LIB system 50 while continuously providing the code compatibility of executable code 33. Alternatively, the CLC system 34 directly produces the CLIs 35 and CNIs 36 from high-level language programming of applications and operating systems 31.

The CLC system 34 decomposes both scaled and non-scaled CLIs 36 that include loops and/or subroutines with branch instructions to a single CLI 35 and the associated CNIs 36 for eliminating branch predictions of those branch instructions already decomposed to a CLI 35, but for executing compatible branch operations of the entire loop/subroutine decomposed.

Each CLI 35 comprises an opcode and an information field containing location information of the first native instruction of the segment packed in the CLI 35. In particular, each opcode is for identifying the same type of the CLIs, such as a conditional branch equal to zero instruction. Any opcodes used for any CLIs must be different from the opcodes used in the native instructions. A CLI has an additional field in order to identify how many native instructions are packed in the CLI. Alternatively, each native instruction packed in the CLI has additional information stored along with the other fields of the CLI in the dedicated main CLIMs 44 for identifying the last native instruction of the native instructions packed in the associated CNIs. In this approach, every last native instruction in every CNI must have different information from the information of the other native instructions in the every CNI.

Any native branch instructions can be considered as an unconditional native branch instruction for the CLC compilation if any native branch instructions cannot determine the branch operations and/or target branch locations during the CLC compilation but can obtain their branch target locations without assisted by a branch predictor. Such native branch instructions are continuously prefetched and fetched without any branch predictions.

In one embodiment, the CLIM system 40 comprises a single or plurality of main CLIMs 44 and main CNIMs 41 and a single or plurality of levels of CLICs and CNICs, such as L2 CLICs 45, L2 CNICs 42, L1 CLICs 46, and L1 CNICs 43. The CLIM system 40 effectively utilize available CLICs 45, 46 and CNICs 42, 43 in terms of the cache size, power consumption, and operational speed by employing a simple, small, and twice or more than twice fast access speed of the microprocessor clock speed.

The CLIM system 40 separately allocates CLIs 35 and CNIs 36 to the different locations of the same or different sequential and/or concurrent accessible CLIMs 44 and CNILs 41, respectively.

The CLIM system 40 stores the scaled CNIs 36 and the associated CLIs 35 in order to balance the usage of the CNICs 42, 43 and the CLICs 45, 46 by allocating the CNIs of the consecutively located CLIs to the dedicated, separate regions in the CNIMs 41, the CNICs 42, 43, the CLIMs 44, and the CLICs 45, 46, such as cache/memory banks, dual or multiple ports memories, and so forth.

In particular, The CLIM system 40 allocates the CNI located right after a branch CLI to the different bank where the CNI is located at the branch target location of the branch CLI for the concurrent prefetch and/or fetch.

In one embodiment, the LIP system 50 comprising a CLIP system 51, a CLIF system 52, and an optional CLBP system 53, prefetches the CLIs 35 and CNIs 36 on the prospective paths in the program flow concurrently or sequentially in a look-ahead manner before fetching and branch predicting the CLIs 35 in a look-ahead manner and fetching CNIs in a concurrent or sequential manner. Furthermore, the LIP system 50 fetches CLIs 35 and CNIs 36 in an accurate manner by only fetching CLIs 35 and/or CNIs 36 from the CLIM system 40.

In one embodiment, the CLIP system 51 prefetches a single or plurality of CLIs 35 and CNIs 36 sequentially and/or concurrently to the CLIF 52 for look-ahead fetching of CLIs 35 and CNIs 36. The CLIP system 51 prefetches CLIs 35 and the associated CNIs 36 from the single or plurality of concurrently accessible main CLIMs 44 and CNIMs 41 via a single or plurality of levels of concurrently accessible CLICs 45, 46 and CNICs 42, 43.

The CLIP system 51 obtains a single or plurality of addresses from the CLIs 35 to a single or plurality of locations in the main CLIMs 44 and/or CLICs 45, 46 for look-ahead prefetching of the single or plurality of the CNIs 36 from the locations of the main CNIMs 41 via the single or plurality of levels of CNICs 42, 43. The CLIP system 51 prefetches the next prospective CLIs 35 and CNIs 36 from both of taken- and not-taken branch paths and continuously prefetch the CLIs 35 and the CNIs 36 from a single or plurality of next paths while the CLIF system 52 fetches both of the prefetched CLIs 35 and CNIs 36 to the modified frontend microprocessor 60.

The CLIP system 51 comprises a modified wrong path prefetcher 54 with a simple CLI decoder 55. The CLIP system 51 does not employ any branch predictors for prefetching. The simple CLI decoder 55 provides branch target addresses to the modified wrong path prefetcher 54 for a look-ahead prefetching capability by decoding the prefetched CLIs 35 if the branch target addresses are obtainable.

The modified wrong path prefetcher 54 prefetches a CLI from the branch target address and another CLI from the next CLI on the fall-through path. The modified wrong path prefetcher 54 prefetches a CLI from the next CLI on the fall-through path if the simple CLI decoder 55 does not provide branch target address of the CLI. If the CLI decoder 55 has a branch prediction capability, the modified wrong path prefetcher 54 prefetches a CLI from the branch target address and another CLI from the next CLI on the fall-through path. The CLIP system 51 continues a single or plurality of the prefetching operations.

The CLIP system 51 prefetches a fewer number of CLIs 35 first from the two times fast CLICs 45, 46 in a sequential and parallel manner and then prefetches the associated native instructions as CNIs 36 in a sequential and parallel via the two times fast CNICs 42, 43.

The CNIs 36 are prefetched from the CNI prefetch address whenever the associated CLIs 35 are prefetched by the CLIP system 51. Alternatively, the CLIP system 51 begins to prefetch native instructions pointed by a single or plurality of addresses pointing locations of the first native instructions in the CNIs. The other native instructions consecutively located in the same CNIs are prefetched until the termination information of the last native instructions of the CNIs is prefetched.

In one embodiment, the CLIF system 52 fetches a single or plurality of CLIs 35 and CNIs 36 sequentially and/or concurrently to the modified frontend microprocessor 60 for look-ahead fetching of CLIs 35 and CNIs 36 if a branch predictor is not available in the CLBP system 53. The CLIF system 52 fetches the same CLIs 35 to the CLBP system 36 sequentially and/or concurrently and fetches the CNIs 36 to the modified frontend microprocessor sequentially and/or concurrently 60 if a branch predictor is available in the CLBP system 53. The CLIF system 52 fetches CLIs 35 and the associated CNIs 36 from the single or plurality of concurrently accessible main CLIMs 44 and CNIMs 41 via a single or plurality of levels of concurrently accessible CLICs 45, 46 and CNICs 42, 43 if necessary.

The CLIF system 52 obtains a single or plurality of addresses from the CLIs 35 to a single or plurality of locations in the main CLIMs 44 or CLICs 45, 46 for look-ahead fetching of the single or plurality of the CNIs 36 from the locations of the main CNIMs 41 or the single or plurality of levels of CNICs 42, 43. The CLIF system 52 fetches the next CLIs 35 and CNIs 36 from only predicted paths and continuously fetches the CLIs 35 and the CNIs 36 from a single or plurality of next predicted paths while the modified frontend microprocessor 60 corrects any mispredicted branches or the CLBP system 53 detects any mispredicted branches.

The CLIF system 52 accurately fetches all CNIs of the associated CLIs by temporarily holding next fetching operation until the next CLI representing a conditional branch instruction is predicted. Therefore, The CLIF system 52 prevents unwanted native instructions from being fetched to the modified frontend microprocessor 60.

The CLIF system 52 fetches a CLI representing a loop comprising one or more than one native instruction and a single or plurality of CNIs in a sequential or concurrent manner and in the compatible native instruction-fetch order in order to compensate multi-cycle access time of the CLIM system 40. More specifically, the fetched CLI and the single or plurality of CNIs are not prefetched not fetched again from the CLIM system 40, but accessed directly from the CLI fetch unit 61 and the CNI fetch unit 66.

The CLIF system 52 fetches a plurality of the scaled CLIs in a pipelined parallel manner in order to increase instruction fetch bandwidth.

The CNIs 36 are fetched from the CNI fetch address whenever the associated CLIs 35 are fetched by the CLIF system 52. Alternatively, the CLIF system 52 begins to fetch native instructions pointed by a single or plurality of addresses pointing locations of the first native instructions in the CNIs. The other native instructions consecutively located in the same CNIs are fetched until the termination information of the last native instructions of the CNIs is fetched.

In one embodiment, the CLBP system 53 is optionally employed by the LIB system 50. The CLBP system 53 comprises a CLI branch predictor to predict the CLIs representing conditional branches independently and to execute the next fetch operation without waiting for the branch prediction result from the branch predictor 62 in the modified frontend microprocessor 60.

In one embodiment, the modified frontend microprocessor 60 comprises a CLI fetch unit 61 and a CLI decode unit 63 for CLIs and a CNI fetch unit 66 and a CNI decode unit 67 for CNIs. The modified frontend microprocessor 60 further comprises components, including a branch predictor 62, interrupt processor 64, stack memory 65, and other useful hardware components found in prior arts. The modified frontend microprocessor 60 receives CLIs and CNIs from the CLIB system 70. More specifically, the modified frontend microprocessor 60 receives the CLIs and the associated CNIs from the CLIF system 52 in a sequential or pipelined parallel manner if the CLBP system 53 does not employ any branch predictor. Otherwise, the CLBP system 53 transmits the CLIs to the modified frontend microprocessor 60.

The modified frontend microprocessor 60 transmits fetch addresses of the CLIs whenever a CLI is fetched into. However, the CLIF system 52 updates next CLI address and fetches the next CLI without waiting the CLI fetch address from the modified frontend microprocessor 60. The CLIF system 52 must synchronize with the next CLI address if any CLI fetched needs to be predicted to the next CLI address by the branch predictor 62. More specifically, the CLIF system 52 uses the CLI address updated by itself or synchronizes with the CLI address transmitted from the modified frontend microprocessor 60 whenever fetching a plurality of CLIs in parallel. If the CLBP system 53 is employed for fetching CLIs, the CLIF system 52 synchronizes with the next CLI address of the predicted CLI from the CLBP system 53. However, the CLIF system 52 must synchronize with the corrected address of the CLI predicted from the modified frontend microprocessor 60 in order to correct the mispredicted CLI.

The CNI fetch address does not necessary to be transmitted from the modified frontend microprocessor 60 to the CLIF system 52 unless any CNI fetch operations is interrupted or disrupted. In this case, the CNI fetch address for resuming the next CNI fetch address is received from the CNI fetch unit 66 to the CLIF system 52 while the CLI fetch unit 61 also recovers the next CLI fetch address and transmits the next CLI fetch address to the CLIF system 52.

In one embodiment, the CLI fetch unit 61 receives a single or plurality of CLIs from the CLIF system 52 or the CLBP system 53 and stores the CLIs to a single or plurality of CLI fetch unit 61. The CLI fetch unit 61 also receives a single or plurality of branch predicted CLI fetch addresses from the branch predictor 62. The CLI fetch unit 61 also receives the next CLI fetch addresses from the interrupt processor 64 for branching to an interrupt service routine, the stack memory 65 for returning from a subroutine, or the backend processor 80 for correcting CLI branch misprediction and any other disrupted operations occurred from the backend microprocessor 80.

The CLI fetch unit 61 forwards a single of plurality of the CLIs to the branch predictor 62. The CLI fetch unit 61 transmits the next CLI fetch address to the CLIF system 52 whenever a CLI is fetched, a mispredicted CLI needs to be corrected, or any CLI fetch operations are interrupted or disrupted.

In one embodiment, the CLI decode unit 63 receives a single or plurality of CLIs from the CLI fetch unit 61 via the branch predictor 62 if the branch predictor 62 does not find any matched CLIs for prediction. The CLI decode unit 63 decodes a single or plurality of the CLIs received concurrently. The CLI decode unit 63 forwards the decoded output to the branch predictor 62 in order to update the branch predictor 62 if any CLIs represent branch instructions required for branch prediction. The CLI decode unit 63 passes information on any CLIs being predicted to the CNI fetch unit 66 in order to continuously be forwarded to the backend microprocessor 80 via the CNI decode unit 67 if necessary.

The CLI decode unit 63 also decodes the CLIs to recover the associated CNIs fetched and initiates to fetch again the associated CNIs to the CNI fetch unit 66 if the associated CNIs previously fetched are changed. More specifically, the CLI decode unit 63 decodes any interrupted or disrupted CLIs fetched from the interrupt processor 64 for processing any interrupts or from the backend microprocessor 80 for correcting mispredicted CLIs via the CLI fetch unit 61. Similarly, the CLI decode unit 63 decodes any CLIs that resume to fetch again the associated CNIs from the stack memory 65 or any storages employed for this purpose via the CNI fetch unit 66 for recovering the interrupted CNIs and for resuming next CNI fetch after processing the interrupted or disrupted CLIs.

In one embodiment, the branch predictor 62 receives a single or plurality of the CLIs for predicting the target addresses of the CLIs from the CLI decode unit 63. The branch predictor 62 initiates CLI branch prediction a single of plurality of clock cycles ahead comparing with the branch prediction with the native instructions fetched and decoded in the CNI. The branch predictor 62 produces the CLI branch prediction results a plurality of clock cycles ahead to initiate the next CLI and CNI fetch operations and reduces taken-branch prediction latencies.

More specifically, the CLI decode unit 63 decodes a CLI representing a loop. The branch predictor 62 reissues the same CLI representing the same loop while the CLI fetch unit 61 holds further CLI fetch operation. Therefore, recursive CLI and the associated CNI prefetch and fetch operations from the CLIM systems 40 are eliminated.

In one embodiment, the interrupt processor 64 receives any interrupt and exception requests from the modified frontend microprocessor 60 and the backend microprocessor 80. The interrupt processor 64 disrupts the CLI and CNI operations processed in the modified frontend microprocessor 60. The interrupt processor 64 temporarily saves necessary information for recovering the disrupted CLI and CNI operations processed in the modified frontend microprocessor 60 to the stack memory 65 or any storages employed for this purpose. The interrupt processor 64 also initiates new CLI and CNI prefetch and fetch operations by updating addresses of the CLIs of the interrupt service routines or the proper locations of the CLIs. The interrupt processor 64 restores the disrupted CLIs and CNIs, respectively, from the stack memory 65 or any storage employed for this purpose to the CLI fetch unit 61 and the CNI fetch unit 66 after completing the interrupt processing operations. The interrupt processor also processes any other interrupt-related operations usually found in prior arts.

In one embodiment, the stack memory 65 stores the information for recovering from any interrupted or disrupted operations initiated by the interrupt processor 64 or by backend microprocessor 80. The recovered information includes for resuming the disrupted CLI and CNI fetch, decode, and any other operations disrupted before.

The stack memory 65 retrieves the information stored when the interrupted or disrupted operations are occurred and forwards the retrieved information to the CLI fetch unit and the CNI fetch unit 66 after completing the interrupted or disrupted operations.

In one embodiment, the CNI fetch unit 66 receives a single or plurality of CNIs from the CLIF system 52. The CNI fetch unit 66 forwards the CNIs fetched to the CNI decode unit 67. The CNI fetch unit 66 updates any pointers, such as CNI program counters, to fetch next native instructions in the CNIs currently fetching. The CNI fetch unit 66 also updates any pointers, such as CNI program counters, to fetch next CNIs after fetching the last native instructions of the current CNIs fetched. Alternatively, the CNI fetch unit 66 updates any pointers, such as CNI program counters, to fetch next CNIs whenever fetching the first native instructions of the current CNIs fetched.

In one embodiment, the CNI decode unit 67 receives a single or plurality of CNIs from the CNI fetch unit 66. The CNI decode unit 67 decodes native instructions as instruction decoding operations found in prior art and forwards the CNIs decoded to the backed microprocessor 80. The CNI decode unit 67 decodes the native instructions in order to extract addresses of the native instructions of the associated CNIs if variable-length native instructions are decoded. In one embodiment, the backend microprocessor 80 typically comprises a backend processing engines 81 including datapaths in prior arts. The backend processing engines 81 generally comprises stages of instruction issue, execution, data access, and result write-back on the pipeline.

FIG. 3 is a diagram showing one embodiment of organizations of a CLIB system 70 for pipelined parallel look-ahead CLI and CNI prefetch/fetch/branch prediction operations. The CLIM system 40 comprises main CLI memory 93, such as 'A' CLIMs, L2 caches 94, such as 'B' CLICs, and L1 caches 95, such as 'C' CLICs, with associated glue logic, where 'A' is greater than equal to 'B' which is greater than equal to 'C'. The CLIM system 40 comprises main CNI memory 93, such as 'J' CNIMs, L2 caches 94, such as 'K' CNICs, and L1 caches 95, such as 'L' CNICs, with associated glue logic, where 'J' is greater than equal to 'K' which is greater than equal to 'L'. The CLI code 91 and the CNI code 92 are generated by the CLC compiler 90 and are allocated to 'A' CLIMs and 'J' CNIMs as main memories 93. The CLIM system 40 is integrated to the LIB 96 comprising a CLIP, a CLIF, and a CLBP. Up to 'A' CLIs are prefetched and the associated 'J' CNIs are prefetched in a pipelined parallel manner. Up to 'B' or 'C' CLIs, respectively, are fetched in a pipelined parallel manner. More specifically, a variable number of CNIs are accessed from the CNIMs 93 via the associated L1 and L2 CNICs 94, 95. Each of CLI and the native instructions in each CNI, respectively, are accessed sequentially. However, CLIs and un-associated CNIs of the CLIs can be accessed concurrently for accurate and timely instruction fetch to microprocessor 97. The CLI access time and CNI access time are overlapped for instruction fetch bandwidth enhancement. Only native instructions that need to be fetched are accessed via the L1 and L2 CLICs and CNICs in a pipelined parallel manner for accurate instruction fetch. In addition, the CLIs assist the CLIB system 70 to determine how many native instructions need to be fetched to the microprocessor 97 in much fewer cycles than the number of cycles required by the similar prefetch and fetch units found in a conventional MMU. The L1 and/or L2 CLICs 94, 95 employed in the CLIM system 40 comprises small, simple, and fast primary caches with a half cycle latency caches. Multiple primary caches are bundled to construct a large L1 or L2 CLIC with the same cycle latency. This organizational principle permits maintaining the same latency of the various cache sizes in the CLIM systems. In addition, the CLIM system 40 usually excludes a typical branch predictor for prefetching instructions although such a predictor is often found in the current memory management unit (MMU) in prior arts. With the advantage of the twice as fast instruction access speed, the CLIM system 40 is capable of delivering a bundle of CLIs and CNIs in a timely manner or with less latency than traditional instruction memory systems in prior arts.

What is claimed is:

1. A system for producing a compiler-assisted look-ahead instruction fetch and branch prediction (CLIB) system for a microprocessor system comprising:
   a compiler-assisted look-ahead code (CLC) generation system;
   a single or plurality of compiler-assisted look-ahead instruction memory (CLIM) system;
   a single or plurality of look-ahead instruction prefetch/fetch/branch prediction (LIB) system;
   a single or plurality of modified frontend microprocessors for the CLIB system; and
   a single or plurality of backend microprocessors in prior arts;
   wherein the system for producing the CLIB system is operable to:
   recognize each compiler-assisted look-ahead instruction (CLI) representing an entire or a part of basic block from executable code compiled from application software and/or operating system for generating CLI code and compatible native instruction (CNI) code wherein the basic block is an instruction segment with only one entry and only one exit in the program and the native instruction (NI) is the instruction discovered from the program compiled by compiler or the instructions available in the target instruction set;
   compose the CLI code comprising CLIs, CNIs, and/or additional information to retrieve a single or plurality of the CNIs of the CLIs during the CLI/CNI prefetch and fetch operations;
   compose the CNI code comprising NIs and/or additional information to access NIs in programmed order and to terminate accessing a single or plurality of the NIs in a CNI during the CNI prefetch and fetch operations;
   fetch the CLIs from the CLI code to a single or plurality of the microprocessors before initiating to fetch the CNIs from the CNI code to the microprocessors according to the CNI fetch order obtained from the associated CLI;
   fetch a single or plurality of the CLIs representing conditional branches to a branch predictor for predicting a single or plurality of locations of the next CLIs in the CLI code and start to fetch the next CLIs to the microprocessors while continuously fetching the CNIs of the previous or current CLIs fetched to the microprocessors; and
   receive a single or plurality of branch prediction results of the CLIs produced by a branch predictor in prior arts even before completely fetching the associated CNIs;
   wherein the CLIB system is further operable to:
   generate CLIs and associated CNIs of applications and/or operating system programmed in high-level programming languages, assembly program compiled with instruction sets, or executable code for microprocessors by the CLC generation system;
   disassemble NIs in an executable code or assembly code to CLI code and CNI code;
   compose a CLI comprising a single or plurality of another CLIs, NIs, and/or additional information to access associated CNIs;
   compose a single or plurality of CLIs representing a single or plurality of levels of loops in the executable code or assembly code;
   compose a CNI comprising a single or plurality of NIs and/or another CNIs;
   compose a single or plurality of CNIs representing a single or plurality of levels of loops in the executable code or assembly code;
   allocate CLIs and CNIs to the sequentially and/or concurrently accessible main CLI memory (CLIM) and main CNI memory (CNIM), respectively;
   access CLIs and CNIs from the sequentially and/or concurrently accessible main CLIM and main CNIM to the sequentially, concurrently, and/or a single or plurality of times quickly accessible CLI cache (CLIC) and CNI cache (CNIC), wherein the plurality of times quickly accessible caches are two or more times faster than the clock speed of the microprocessors;
   retrieve the NIs from the CNI code and/or CLI code during the CNI and/or CLI fetch operation via a single or plurality of the LIB system;
   perform pipelined and/or parallel look-ahead CLI and CNI prefetch/fetch/branch prediction operations;
   prefetch the CLIs and the CNIs, respectively, from the main CLIM and/or level-2 (L2) CLIC to level-1 (L1) CLIC and from the main CNIM and/or L2 CNIC to L1 CNIC via compiler-assisted look-ahead instruction prefetch (CLIP) system in the LIB system;
   terminate the CLI prefetch after continuously prefetching the CLIs from both of the branched and fall-through paths one or more times to the CLICs in the CLIP system;
   prefetch the CLIs addressed by the LIB system to the CLICs whenever a single or plurality of branch target addresses is obtained from a single or plurality of the LIB system or the modified frontend microprocessors for the CLIB system;
   decode the prefetched CLIs for prefetching the associated CNIs and for prefetching variable-length NIs via CLI decoder in the CLIP system;
   perform look-ahead fetch operations of the CLIs addressed by compiler-assisted look-ahead instruction fetch (CLIF) system in the LIB system to the modified frontend microprocessors whenever a single or plurality of branch target addresses is obtained from a single or plurality of the LIB system or the modified frontend microprocessors for the CLIB system;
   decode the fetched CLIs for look-ahead fetching the associated CNIs and for look-ahead fetching fixed- and/or variable-length NIs via the CLIF system to the modified frontend microprocessors;
   perform look-ahead branch prediction operations of the CLIs received with a branch predictor regardless of fetching the associated CNIs;
   perform next look-ahead prefetch and fetch operations of CLIs and NIs of the CNIs according to the branch prediction results;
   identify a CLI representing a single or plurality of loops by the CLI decoder in order to reuse the same CLI representing the loops for the look-ahead branch prediction while holding further CLI fetch operation;
   handle any disrupted prefetch and/or fetch operations of CLIs and/or NIs of the CNIs caused by branch predictors, interrupt processors, or any other units in the microprocessors or the LIB system for look-ahead prefetch and fetch operations;
   resume the prefetch and/or fetch operations of the CLIs and/or NIs of the CNIs by recovering the information of the prefetch and/or fetch operations of the CLIs and/or NIs of the CNIs after completing the disrupted prefetch and/or fetch operations;

access a fixed or a variable number of NIs of the CNIs from the main CNIMs via the associated L1 and L2 CNICs;
access each of CLI and the NIs of each CNI, respectively;
access CLIs and NIs of the un-associated CNIs of the CLIs concurrently;
overlap the CLI access time and NIs of the CNI access time for enhancing instruction fetch bandwidth;
access only NIs that need to be fetched via the L1 and L2 CLICs and CNICs in a pipelined parallel manner for accurate instruction fetch;
determine how many NIs need to be fetched to the microprocessor within fewer cycles via the CLIB system assisted by the CLIs;
employ L1 and/or L2 CLICs and CNICs as small, simple, and fast primary caches with a half or less cycle latency of the microprocessor clock cycle latency;
construct a larger size of L1 or L2 CLICs and CNICs with the same cycle latency by bundling a plurality of primary caches;
maintain the same latency of the various sizes of CLICs and CNICs in the CLIM system for further performance enhancement;
exclude a branch predictor for prefetching CLIs and NIs of the CNIs from the CLIM system.

2. The apparatus for producing a CLIB system of claim 1, wherein a single or plurality of the CLIM systems further comprises:
a single or plurality of main CLIM and CNIM systems;
a single or plurality of L2 CNICs/CNICs; and
a single or plurality of L1 CNICs/CNICs;
wherein the apparatus for producing the CLIM systems is operable to:
allocate CLIs and NIs of CNIs to the different locations of the sequentially and/or concurrently accessible main CLIMs and CNIMs in the CLIM systems, respectively, for a single or plurality of times quick access via a plurality of CNICs and CNICs;
prefetch the CLIs from the main CLIMs to the L2/L1 CNICs and/or from the L2 CNICs to the L1 CNICs at the addresses received from the CLIP systems in the LIB systems;
prefetch NIs of the CNIs from the main CNIMs to the L2/L1 CNICs and/or from the L2 CNICs to the L1 CNICs at the addresses decoded from the associated CLIs prefetched from the main CLIMs or from the L2 CNICs;
prefetch the CLIs from both of the branched and fall through paths one or more times to the CNICs;
prefetch consecutive NIs of the CNIs addressed decoded from the associated CLIs by accessing the initial locations of the NIs in the CNIs and by continuously accessing NIs in next locations of NIs until the last NIs of the CNIs are accessed;
fetch the CLIs from the main CLIMs to the L1 CLICs at the addresses received from the CLIF systems in the LIB systems if L2 CLICs are not existed or the CLIs are not available in the L2 CLICs;
fetch the CLIs from the L2 CLICs to the L1 CLICs at the addresses received from the CLIF systems in the LIB systems if L2 CLICs are existed and the CLIs are available in the L2 CLICs;
fetch NIs of the CNIs from the main CNIMs to the L1 CNICs at the addresses decoded from the associated CLIs fetched from the main CLIMs if L2 CNICs are not existed or the NIs of the CNIs are not available in the L2 CNICs;
fetch NIs of the CNIs from the L2 CNICs to the L1 CNICs at the addresses decoded from the associated CLIs fetched from the L2 CNICs;
fetch the CLIs from the branch predicted paths;
fetch consecutive NIs of the CNIs addressed decoded from the associated CLIs by accessing the initial locations of the NIs in the CNIs and by continuously accessing NIs in next locations of NIs until the last NIs of the CNIs are accessed;
fetch the CLIs from the L1 CLICs at the addresses received from the CLIF systems in the LIB systems to the CLI fetch units in the modified frontend microprocessors for the CLIB systems if L1 CLICs are existed and the CLIs are available in the L1 CLICs;
fetch the CLIs representing any branch instructions that need to be predicted from the L1 CLICs at the addresses received from the CLIF systems via the compiler-assisted look-ahead branch prediction (CLBP) systems in the LIB systems to CLI fetch units in the modified frontend microprocessors for the CLIB systems if L1 CLICs are existed and the CLIs are available in the L1 CLICs;
fetch the CLIs representing any branch instructions that need to be predicted from the L1 CLICs at the addresses received from branch predictors in the modified frontend microprocessors via the CLIF systems in the LIB systems to CLI fetch units in the modified frontend microprocessors for the CLIB systems if L1 CLICs are existed, the CLIs are available in the L1 CLICs, and the CLBP systems are not existed; and
fetch NIs of the CNIs from the L1 CNICs at the addresses decoded from the associated CLIs fetched from the L1 CLICs to the CNI fetch units in the modified frontend microprocessors for the CLIB systems via the CLIF systems in the LIB systems if L1 CNICs are existed and the NIs of the CNIs are available in the L1 CNICs.

3. The apparatus for producing a CLIB system of claim 1, wherein the single or plurality of the LIM systems further comprises:
a single or plurality of the CLIP systems;
a single or plurality of the CLIF systems; and
a single or plurality of the CLBP systems;
wherein the single or plurality of the LIM systems is operable to:
prefetch and/or fetch the CLIs and NIs of the associated CNIs allocated in the different locations of the sequentially, concurrently, and/or a plurality of times quickly accessible CLICs and main CLIMs and CNIMs in a look-ahead manner;
prefetch and/or fetch CNIs concurrently by accessing the NIs of the consecutive CLIs allocated in the different banks in the sequentially, concurrently, and/or a plurality of times quickly accessible CNICs and main CNIMs in a look-ahead manner;
concurrently prefetch and/or fetch NIs of the CNIs located right after branch instructions stored in the different bank where the NIs of the CNIs are located at the branch target locations of the branch instructions in a look-ahead manner;
access the CLIs from the different locations of the sequentially, concurrently, and/or a plurality of times quickly accessible main CLIMs;

access NIs of the CNIs from the different banks of the main CNIMs for parallel prefetching and/or fetching;

access the CLIs from the different locations of the sequentially, concurrently, and/or a plurality of times quickly accessible the CLICs;

access NIs of the CNIs from the different locations of the sequentially, concurrently, and/or a plurality of times quickly accessible the CNICs;

prefetch the CLIs and the CNIs, respectively, from the CLIM system via the CLIP system;

terminate the CLI prefetch after continuously prefetching CLIs from both of the branched and fall-through paths one or more times to the CLICs via the CLIP system;

perform look-ahead fetching of the CLIs addressed by the CLIF system to the modified frontend microprocessors whenever a branch target address is obtained from the CLBP system or the modified frontend microprocessor;

perform look-ahead branch prediction operations of the CLIs using the CLBP system;

perform next look-ahead prefetch and fetch operations of CLIs and NIs of the CNIs according to the branch prediction results for enhancing performance of the microprocessor;

identify CLIs representing a single or plurality of loops in order to reuse the same CLIs for the look-ahead branch prediction while holding further CLI fetch operation;

handle any disrupting prefetch and/or fetch operations of CLIs and/or NIs of the CNIs caused by branch predictors, interrupt processors, or any other units in the microprocessors or the CLBP systems for look-ahead prefetch and fetch operations; and resume the prefetch and/or fetch operations of the CLIs and/or NIs of the CNIs by recovering the information of the prefetch and/or fetch operations of the CLIs and/or NIs of the CNIs after completing the disrupting prefetch and/or fetch operations.

4. The system for producing the single or plurality of the LIB system of claim 3, wherein the single or plurality of the CLIP system further comprises:

a modified wrong-path prefetcher; and a CLI decoder; wherein the single or plurality of the CLIP system is operable to:

prefetch the CLIs and the NIs of the CNIs, respectively, from the main CLIM and/or L2 CLIC to L1 CLIC and from the main CNIM and/or L2 CNIC to L1 CNIC;

terminate the CLI prefetch after continuously prefetching the CLIs from both of the predicted and non-predicted paths one or more times to the CLICs via the modified wrong-path prefetcher in the CLIP system;

address the CLIs and prefetch the CLIs to the CLICs whenever a single or plurality of disrupted CLI addresses, including branch and interrupt target addresses, is obtained from a single or plurality of the CLBP system or the modified frontend microprocessors for the CLIB system via the CLIF system;

decode the prefetched CLIs for prefetching the NIs of the associated CNIs and for prefetching variable-length NIs of the associated CNIs;

perform next look-ahead prefetch operations of CLIs and NIs of the associated CNIs according to the branch prediction results for enhancing performance of the microprocessor;

handle any disrupted prefetch operations of CLIs and/or NIs of the associated CNIs caused by branch predictors, interrupt processors, or any other units in the microprocessors or the CLBP system for look-ahead prefetch operations; and resume the prefetch operations of the CLIs and/or the NIs of the associated CNIs by recovering the information of the prefetch operations of the CLIs and/or the NIs of the associated CNIs after completing the disrupted prefetch operations.

5. The system for producing the CLIP system of claim 4, wherein the modified wrong-path prefetcher is operable to:

prefetch CLIs from both of the branched and fall-through paths;

hold and update prefetch addresses of the next CLI from both of the branched and fall-through paths;

prefetch CLIs from both of the branched and fall-through paths one or more times continuously; and receive branch predicted addresses or any disrupted addresses of the CLIs for prefetching the CLIs via the CLIF system.

6. The system for producing the single or plurality of the CLIP system of claim 4, wherein the CLI decoder is operable to:

decode the prefetched CLIs for prefetching the NIs of the associated CNIs; and decode the prefetched CLIs for prefetching variable-length NIs of the associated CNIs.

7. The system for producing the single or plurality of the LIB system of claim 3, wherein the single or plurality of the CLIF system is operable to:

address the CLIs and perform look-ahead fetch operations of the CLIs from the L1 CLICs to the modified frontend microprocessors whenever a single or plurality of branch target addresses is obtained from the single or plurality of the CLBP system or the modified frontend microprocessors for the CLIB system;

decode the fetched CLIs for look-ahead fetching the NIs of the associated CNIs and for look-ahead fetching fixed- and/or variable-length NIs to the modified frontend microprocessors;

perform next look-ahead fetch operations of CLIs and NIs of the associated CNIs according to the branch prediction results for enhancing performance of the microprocessor;

identify a CLI representing a single or plurality of loops in order to reuse the same CLI representing the a single or plurality of loops for the look-ahead branch prediction while holding further CLI fetch operation;

handle any disrupted fetch operations of CLIs and/or NIs of the associated CNIs caused by branch predictors, interrupt processors, or any other units in the microprocessors or the CLBP system for look-ahead fetch operations; and resume the fetch operations of the CLIs and/or the NIs of the associated CNIs by recovering the information of the fetch operations of the CLIs and/or the NIs of the associated CNIs after completing the disrupted fetch operations.

8. The system for producing the single or plurality of the LIB system of claim 3, wherein the single or plurality of the CLBP system is operable to:

perform look-ahead branch prediction operations of the CLIs received within a single or plurality of clock cycles ahead for completely fetching the NIs of the associated CLIs;

examine any CLIs for predicting their branch behaviors and branch target locations;
produce branch target locations of the predicted CLIs; and
forward the branch prediction results to the CLIF system.

9. The system for producing a CLIB system of claim 1, wherein the single or plurality of modified frontend microprocessors for the CLIB system further comprises:
a CLI fetch unit;
a CLI decode unit;
a branch predictor;
a CNI fetch unit;
a CNI decode unit;
an interrupt processor; and
a stack memory;
wherein the single or plurality of modified frontend microprocessors for the CLIB system is operable to:
store the fetched CLIs or forward the fetched CLIs to the branch predictor via the CLI fetch unit;
examine any CLIs in order to predict the branch operations and branch target locations of the fetched CLIs if the CLBP system does not exist;
forward the information for branch prediction to the branch predictor;
initiate the branch prediction operations of the CLIs fetched before a single or plurality of clock cycles ahead the NIs of the associated CNIs are completely fetched and/or decoded;
initiate next CLI and NIs of the CNI prefetch and fetch operations from the branch predicted location before a plurality of clock cycles ahead for enhancing performance of the microprocessor;
identify the CLI representing a single or plurality of loops and hold further CLI fetched while reusing the same CLI and the same NIs of the associated CNIs of the loops fetched for prefetching, fetching, and branch predicting the CLI and the NIs of the CNIs;
detect and process the disrupted fetch, decode, and execution operations of CLIs and NIs of the CNIs caused by branch misprediction, interrupts, and other exceptions;
store the recovering information from the disrupted operations to the stack memory;
update information to prefetch and fetch the CLIs and/or NIs of the CNIs for processing the disrupted operations;
restore the recovering information from the disrupted operations from the stack memory;
adjust an address of the first NI of the next CNI whenever the last NI of the current CNI fetched;
adjust an address of the next NI of the current CNI being fetched whenever any NI of the current CNI is fetched except for fetching the last NI of the current CNI; and
transmit the information for prefetching and fetching CLIs to the CLIM system whenever a new CLI prefetch and fetch address is received from the branch predictor, the interrupt processor, or the backend microprocessor.

10. The system for producing the single or plurality of modified frontend microprocessors for the CLIB system of claim 9, wherein the CLI fetch unit is operable to:
Receive the information for prefetching and fetching CLIs from the branch predictor, the interrupt processor, or the backend microprocessor and transmit the information for prefetching and fetching the CLIs to the CLIM system;
fetch a single or plurality of CLIs from the CLIF system via the locations at the CLICs in sequential or parallel;
fetch sequentially a CLI representing entire NIs in a basic block;
fetch concurrently a plurality of CLIs representing a plurality of NIs, which include a single or plurality of NI segments in the same basic block or in a single or plurality of the different basic blocks;
hold a single or plurality of current CLI addresses to fetch the CLIs from the CLICs and/or CLIMs via the CLIP system and the CLIF system;
store the fetched CLIs in the CLI fetch unit;
forward the fetched CLIs to the branch predictor if the CLIs need to be predicted;
forward the fetched CLIs to the CLI decode unit if the CLIs do not need to be predicted;
adjust addresses to fetch next CLIs and to forward the fetched CLIs to the branch predictor for branch prediction;
receive the branch prediction results of the CLIs from the branch predictor in a look-ahead manner;
receive information for performing the disrupted operations of the CLI fetch, such as interrupts from the interrupt processor, branch misprediction corrections from the backend microprocessor, and other disrupted operations occurred inside and outside of the microprocessor;
store recovering information of the current disrupted operations to the stack memory;
update the single or plurality of next CLI addresses if the current CLIs do not represent any branch instructions fetched;
update a single or plurality of current or next branch predicted addresses to the stacks in order to resume the disrupted CLI operations;
retrieve the addresses of the NIs of the associated CNIs stored in the stacks to the branch predicted addresses of the CLIs after the disrupted operations are completed;
update prefetching and/or fetching information of the CLIs for initiating the disrupted operations;
restore prefetching and/or fetching information of the CLIs for resuming normal operations after completion of the disrupted operations;
reuse the CLIs fetched for the CLIs representing a single or plurality of loops;
forward the same CLIs representing the single or plurality of loops to the branch predictor; and
hold the CLI fetch operations for fetching any CLIs from the CLIP system and the CLIF system whenever forwarding the same fetched CLIs representing a single or plurality of loops to the branch predictor.

11. The system for producing the single or plurality of modified frontend microprocessors for the CLIB system of claim 9, wherein the branch predictor is operable to:
receive a single or plurality of the CLIs fetched from the CLI fetch unit;
discard any CLIs, including jumps, subroutine calls, and/or subroutine returns, which do not require to decode and execute for compatible operations with the NIs of the associated CNIs;
screen the CLIs for required branch operations and branch target locations;
generate branch prediction results of the CLIs if the CLIs need to perform branch prediction operations;
generate branch prediction results of the CLIs representing a single or plurality of loops while forwarding the same CLIs representing the same single or plurality of loops to the CLI decode unit;

receive the information for branch prediction from the CLI fetch unit and/or other useful units in the modified frontend microprocessor and the backend microprocessor;

produce and transmit a single or plurality of branch target addresses for prefetching and fetching CLIs whenever a single or plurality of taken-branches are predicted; and update the single or plurality of addresses of the CLIs at the branch target locations if the current CLIs represent the branch instructions.

12. The system for producing the single or plurality of modified frontend microprocessors for the CLIB system of claim 9, wherein the CLI decode unit is operable to:

receive, store, and decode the CLIs from the CLI fetch unit if the CLIs require to be decoded and executed for compatible operations with the NIs of the associated CNIs;

decode the CLIs to redirect the NIs of the associated CNIs fetched to the CNI fetch unit if the fetched NIs of the CNIs in the CNI fetch unit are changed;

screen the CLIs representing a single or plurality of loops while forwarding the same CLIs representing the same loops to the backend microprocessors; and transmit the decoded information of the CLIs to fetch the NIs of the associated CNIs from the CNI fetch unit if the same NIs of the CNIs are used.

13. The system for producing the single or plurality of modified frontend microprocessors for the CLIB system of claim 9, wherein the CNI fetch unit is operable to:

fetch sequentially and/or concurrently NIs of the CNIs from the CNICs or from the CNICs via the CLIF system;

fetch NIs of the CNIs to the CNI fetch unit whenever new locations of the NIs of the CNIs are obtained by decoding the fetched CLIs;

fetch NIs of the CNIs to the CNI fetch unit whenever new locations of the NIs of the CNIs are obtained from the branch predictor;

fetch NIs of the CNIs to the CNI fetch unit whenever new locations of the NIs of the CNIs are obtained from the interrupt processor;

fetch NIs of the CNIs to the CNI fetch unit whenever new locations of the NIs of the CNIs are obtained from the backend microprocessors for correcting mispredicted branches;

store the fetched NIs of the CNIs to the CNI fetch unit;

fetch variable-length NIs of the CNIs from the CNI fetch units;

forward NIs of the CNIs from the CNI fetch unit to the CNI decode unit;

adjust addresses of the NIs of the CNIs for forwarding next NIs of the CNIs from the CNI fetch unit;

update the next addresses of the NIs of the CNIs to the CNI fetch unit if the current NIs of the CNIs do not contain any branch instructions;

update the addresses of the NIs of the CNIs at the branch target locations if the current NIs of the CNIs contain the branch instructions;

receive information for performing the disrupted operations of the NIs of the CNIs, such as interrupts by the interrupt processor, branch misprediction corrections by the backend microprocessors, and other disrupted operations occurred in the microprocessors;

update the addresses of the NIs of the CNIs for prefetching and/or fetching the NIs of the CNIs;

restore the addresses of the NIs of the CNIs stored in the stack memory to the CNI fetch unit for resuming normal fetching operations of the NIs of the CNIs;

forward the NIs of the CNIs representing a single or plurality of loops to the CNI decode unit according to the branch prediction results from the branch predictor; and hold the fetch operations of the NIs of the CNIs from the CLIP system and/or the CLIF system whenever forwarding the same NIs of the CNIs representing a single or plurality of loops in the CNI fetch unit to the CNI decode unit.

14. The system for producing the single or plurality of modified frontend microprocessors for the CLIB system of claim 9, wherein the CNI decode unit is operable to:

receive a single or plurality of the fetched NIs of the CNIs from the CNI fetch unit;

decode the fetched NIs of the CNIs and/or conditional branch NIs for fetching the next CNI and/or fixed- and variable-length NIs to the CNI fetch unit;

screen any fetched NIs of the CNIs required for branch prediction operations and/or branch target locations if any associated CLIs are not fetched;

forward branch prediction information to the branch predictor if any CLIs are not fetched;

screen the fetched NIs of the CNIs representing a single or plurality of loops while forwarding the same fetched NIs of the CNIs of the loops to the branch predictor if any CLIs are not fetched;

transmit the decoded information of the fetched NIs of the CNIs to fetch the NIs of the associated CNIs from the CLIP system and/or the CLIF system to the CNI fetch unit if any CLIs are not fetched or to the CNI fetch unit if the CNI fetch unit reuses the fetched NIs of the CNIs and any CLIs are not fetched; and forward the decoded NIs of the CNIs to a single or plurality of the backend microprocessors for executing the NIs decoded.

15. A method of the compiler-assisted look-ahead code (CLC) compiler comprising:

a single or plurality of inputs of a CLC compiler; and a single or plurality of outputs of the CLC compiler;

wherein the method of the CLC compiler is operable to:

receive a single or plurality of instruction set architectures (ISAs) of the microprocessors for generating assembly and/or executable code of software, including application software and/or system software, such as operating system;

receive a single or plurality of assembly code programs or binary executable code programs as inputs of the CLC compiler;

receive a single or plurality of software programs as inputs of the CLC compiler;

forward the received inputs to the CLC compiler;

generate scaled and/or non-scaled CLI code and the associated CNI code as the outputs of the CLC compiler from the input programs received, wherein the scaled CLI code only contains the CLIs representing a certain number of NIs of the associated CNIs and the non-scaled CLI code contains the CLIs representing any number of NIs of the associated CNIs;

generate the CLIs representing non-scaled basic blocks and/or the CLIs representing scaled basic blocks of the input programs received, wherein a scaled basic block is represented by a single of plurality of the scaled CLIs and a non-scaled basic block is represented by a single non-scaled CLI; and generate the NIs of the CNIs presenting a single or plurality of the scaled or the non-scaled CLIs of the input programs received;

generate CLIs and associated CNIs of applications and/or operating system programmed in high-level programming languages, assembly program compiled with instruction sets, or executable code for microprocessors;

generate a CLI representing an entire or a part of basic block identified by the CLC system;

generate a CNI comprising a single or plurality of NIs of an entire or a part of basic block represented as the CLI by the CLC system;

generate a CLI representing a single or plurality of loops;

generate a CLI representing a basic block including unconditional flow control instructions, such as unconditional jumps, subroutine callers and/or returners without fetching the unconditional flow control NIs to the microprocessors while performing look-ahead prefetch and/or fetch operation of the CLI;

encode a CLI comprising a plurality of fields to (i) i0 identify the CLI, (2) access a single or plurality of NIs in the associated CNI of the CLI, (3) access plurality of CLIs and NIs in the associated CNIs of the CLIs in sequential or parallel, and (4) identify look-ahead branch prediction of the CLI;

generate a CNI comprising NIs in an entire or a part of basic block represented by a CLI;

generate a CNI comprising NIs in a single or plurality of loops represented by a CLI;

generate a CNI comprising NIs without unconditional flow control NIs in an entire or a part of basic block including the unconditional flow control NIs, such as unconditional jumps, subroutine callers and/or returners to fetch the NIs without the unconditional flow control NIs to the microprocessors while performing look-ahead prefetch and/or fetch operation of the CNI; and encode a CNI comprising NIs with additional information of the CLI for accurate, compatible, and parallel prefetch and/or fetch operations of NIs.

16. The method of the compiler-assisted look-ahead code (CLC) compiler of claim 15, wherein the CLC compiler further comprises:

an instruction packing and scaling block; and a single or plurality of inputs and outputs of the CLC compiler;

wherein the CLC compiler is operable to:

identify packable segments of instructions, such as basic blocks, in the input programs;

scale the packable segments of the instructions identified;

generate qualified scaled or non-scaled packable segments of the instructions for generating CLIs for look-ahead prefetching, fetching, and/or branch predicting operations in order to reduce instruction fetch latency of the microprocessors and the NIs of the associated CNIs for prefetching and fetching compatible NIs to the microprocessors in an accurate and timely manner; and generate the CLIs and the NIs of the CNIs for prefetching and fetching in a sequential and/or parallel manner via a single or plurality of twice fast CLICs and CNICs as the microprocessor clock cycle in order to reduce latency of branch prediction and to increase instruction fetch bandwidth, which is a number of instructions fetched per the microprocessor clock cycle, with a CLIB system.

17. The method of the CLC compiler of claim 16, wherein the instruction packing and scaling block is operable to:

identify the CLIs representing a single or plurality of segments of instructions, such as basic blocks, in the input programs as packable segments and/or other packable CLIs identified from the previous compilation;

identify the CLIs containing information to predicting branch operations;

identify the CLIs obtaining branch target locations from the packable segments;

identify the CLIs accessing locations of the NIs of the associated CNIs;

decompose the input program to the instruction fetch and branch prediction friendly instructions as CLIs and compatible form of NIs, as CNIs;

create a pair of instructions comprising a CLI and a single or plurality of CNIs from segments of NIs, such as basic blocks of the compiled input program, where a basic block is a portion of the compiled program with only one entry point and only one exit point;

create CLIs for fetching and/or predicting branch of the CLIs quickly and accurately while the single or plurality of the NIs of the CNIs are delivered in compatible order;

contain initial access information of the NIs of the CNIs into the CLIs for parallel access of the CLIs and the NIs of the associated CNIs;

create the CLIs and the NIs of the CNIs for allocating them to different locations in a single or plurality of CLIMs and CNIMs and for accessing them from and to a single or plurality of levels of CLICs and CNICs;

create a CLI for containing an address of next CLI if the CLI representing a flow control instruction;

perform instruction packing and scaling with various CLC compiler inputs and predetermined instruction packing and scaling conditions given as inputs;

perform instruction packing and scaling with various CLC compiler inputs including target instruction set architectures, compiled assembly code or executable binary code, and/or high-level applications and operating system programs;

perform instruction packing and scaling with predetermined instruction packing and scaling conditions including requirements to set order of instruction packing and scaling before the CLC compilation as well as to switch to next instruction packing and/or scaling operations;

generate a single or plurality of CLIs and NIs of the associated CNIs if a qualified segment of NIs is identified;

terminate current CLC compilation or switch to the next instruction packing and/or scaling operations if any qualified segment of NIs is not identified;

apply input scaling parameters to the packable segment of NIs, and then generate qualified segment of NIs with the predetermined instruction packing and scaling conditions after identification of packable segment of NIs;

generate a single or plurality of CLIs and NIs of the associated CNIs by using the qualified segment of NIs;

continue the instruction packing and scaling process for the next segment of NIs identified if the current segment of NIs is successfully evaluated for packing;

evaluate termination of the current instruction packing if successfully generating a single or plurality of CLIs and NIs of the associated CNIs;

terminate entire instruction packing process if the current segment of NIs is the last segment of NIs for packing;
initiate new instruction packing and scaling if the current segment of NIs is not the last segment of NIs for packing; and
receive and establish preferred instruction packing and scaling orders as new instruction packing and scaling conditions for the instruction packing and scaling process with a plurality of instruction set architectures.

* * * * *